US009542477B2

(12) United States Patent
Lightner et al.

(10) Patent No.: US 9,542,477 B2
(45) Date of Patent: Jan. 10, 2017

(54) METHOD OF AUTOMATED DISCOVERY OF TOPICS RELATEDNESS

(71) Applicant: QBASE, LLC, Reston, VA (US)

(72) Inventors: Scott Lightner, Leesburg, VA (US); Franz Weckesser, Spring Valley, OH (US); Sanjay Boddhu, Dayton, OH (US); Rakesh Dave, Dayton, OH (US); Robert Flagg, Portland, ME (US)

(73) Assignee: QBase, LLC, Reston, VA (US)

( * ) Notice: Subject to any disclaimer, the term of this patent is extended or adjusted under 35 U.S.C. 154(b) by 52 days.

(21) Appl. No.: 14/557,906

(22) Filed: Dec. 2, 2014

(65) Prior Publication Data
US 2015/0154305 A1  Jun. 4, 2015

Related U.S. Application Data

(60) Provisional application No. 61/910,754, filed on Dec. 2, 2013.

(51) Int. Cl.
*G06F 17/30* (2006.01)
(52) U.S. Cl.
CPC ..... *G06F 17/3069* (2013.01); *G06F 17/30067* (2013.01); *G06F 17/30864* (2013.01); *G06F 17/30867* (2013.01)
(58) Field of Classification Search
CPC .............. G06F 17/3069; G06F 17/3071; G06F 17/30864; G06F 17/30867; G06F 17/30067
USPC ................................................ 707/726, 791
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,738,759 B1 | 5/2004 | Wheeler et al. | |
| 6,832,373 B2 | 12/2004 | O'Neill | |

(Continued)

FOREIGN PATENT DOCUMENTS

WO    2013/003770 A2    1/2013

OTHER PUBLICATIONS

Canhui Wang et al, "Automatic Online News Issue Construction in Web Environment", 2008.*

(Continued)

*Primary Examiner* — Shahid Alam
(74) *Attorney, Agent, or Firm* — Eric L. Sophir; Dentons US LLP

(57) ABSTRACT

A computer system and method for automated discovery of topic relatedness are disclosed. According to an embodiment, topics within documents from a corpus may be discovered by applying multiple topic identification (ID) models, such as multi-component latent Dirichlet allocation (MC-LDA) or similar methods. Each topic model may differ in a number of topics. Discovered topics may be linked to the associated document. Relatedness between discovered topics may be determined by analyzing co-occurring topic IDs from the different models, assigning topic relatedness scores, where related topics may be used for matching/linking a feature of interest. The disclosed method may have an increased disambiguation precision, and may allow the matching and linking of documents using the discovered relationships.

14 Claims, 3 Drawing Sheets

(56) References Cited

U.S. PATENT DOCUMENTS

| | | | |
|---|---|---|---|
| 6,832,737 B2 | 12/2004 | Karlsson et al. | |
| 7,058,846 B1 | 6/2006 | Kelkar et al. | |
| 7,130,837 B2* | 10/2006 | Tsochantaridis | G06F 17/30616 |
| | | | 706/45 |
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | Van Rietschote et al. | |
| 7,681,075 B2 | 3/2010 | Havemose et al. | |
| 7,818,615 B2 | 10/2010 | Krajewski et al. | |
| 7,899,871 B1 | 3/2011 | Kumar et al. | |
| 8,055,933 B2 | 11/2011 | Jaehde et al. | |
| 8,090,717 B1* | 1/2012 | Bharat et al. | 707/731 |
| 8,122,026 B1 | 2/2012 | Laroco et al. | |
| 8,122,047 B2* | 2/2012 | Kanigsberg | G06F 17/30867 |
| | | | 707/765 |
| 8,234,274 B2* | 7/2012 | Guo | G06F 17/30014 |
| | | | 707/726 |
| 8,341,622 B1 | 12/2012 | Eatough | |
| 8,345,998 B2 | 1/2013 | Malik et al. | |
| 8,356,036 B2 | 1/2013 | Bechtel et al. | |
| 8,375,073 B1 | 2/2013 | Jain | |
| 8,423,522 B2 | 4/2013 | Lang et al. | |
| 8,429,256 B2 | 4/2013 | Vidal et al. | |
| 8,510,257 B2* | 8/2013 | Archambeau | G06K 9/6249 |
| | | | 706/52 |
| 8,645,298 B2* | 2/2014 | Hennig | G06N 7/005 |
| | | | 707/727 |
| 8,726,267 B2 | 5/2014 | Li et al. | |
| 8,782,018 B2 | 7/2014 | Shim et al. | |
| 8,972,396 B1* | 3/2015 | Zhang et al. | 707/731 |
| 8,995,717 B2 | 3/2015 | Cheng et al. | |
| 9,009,153 B2 | 4/2015 | Khan et al. | |
| 9,025,892 B1 | 5/2015 | Lightner et al. | |
| 9,032,387 B1 | 5/2015 | Hill et al. | |
| 9,251,250 B2* | 2/2016 | Hershey | G06F 17/30663 |
| | | | 707/738 |
| 2001/0037398 A1 | 11/2001 | Chao et al. | |
| 2002/0031260 A1 | 3/2002 | Thawonmas et al. | |
| 2002/0052730 A1* | 5/2002 | Nakao | 704/10 |
| 2002/0099700 A1* | 7/2002 | Li | 707/5 |
| 2002/0165847 A1 | 11/2002 | McCartney et al. | |
| 2002/0174138 A1 | 11/2002 | Nakamura et al. | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0010502 A1 | 1/2004 | Bomfim et al. | |
| 2004/0027349 A1 | 2/2004 | Landau et al. | |
| 2004/0049478 A1 | 3/2004 | Jasper et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2004/0243645 A1 | 12/2004 | Broder et al. | |
| 2005/0192994 A1 | 9/2005 | Caldwell et al. | |
| 2006/0101081 A1 | 5/2006 | Lin et al. | |
| 2006/0122978 A1 | 6/2006 | Brill et al. | |
| 2006/0294071 A1 | 12/2006 | Weare et al. | |
| 2007/0005639 A1 | 1/2007 | Gaussier et al. | |
| 2007/0005654 A1 | 1/2007 | Schachar et al. | |
| 2007/0073708 A1 | 3/2007 | Smith et al. | |
| 2007/0156748 A1 | 7/2007 | Emam et al. | |
| 2007/0174167 A1 | 7/2007 | Natella et al. | |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250501 A1 | 10/2007 | Grubb et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2008/0077570 A1 | 3/2008 | Tang et al. | |
| 2008/0109399 A1* | 5/2008 | Liao et al. | 707/2 |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0144609 A1 | 6/2009 | Liang et al. | |
| 2009/0216734 A1 | 8/2009 | Aghajanyan et al. | |
| 2009/0222395 A1 | 9/2009 | Light et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0100437 A1* | 4/2010 | Dean et al. | 705/14.52 |
| 2010/0138931 A1 | 6/2010 | Thorley et al. | |
| 2010/0161566 A1 | 6/2010 | Adair et al. | |
| 2010/0161611 A1* | 6/2010 | Guo | G06N 7/005 |
| | | | 707/738 |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0047167 A1 | 2/2011 | Caceres | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0161333 A1 | 6/2011 | Langseth et al. | |
| 2011/0270845 A1* | 11/2011 | Lin | G06F 17/30864 |
| | | | 707/748 |
| 2011/0282888 A1 | 11/2011 | Koperski et al. | |
| 2011/0296390 A1 | 12/2011 | Vidal et al. | |
| 2011/0296397 A1 | 12/2011 | Vidal et al. | |
| 2012/0016875 A1 | 1/2012 | Jin et al. | |
| 2012/0016877 A1* | 1/2012 | Vadrevu et al. | 707/737 |
| 2012/0030220 A1 | 2/2012 | Edwards et al. | |
| 2012/0059839 A1 | 3/2012 | Andrade et al. | |
| 2012/0095952 A1* | 4/2012 | Archambeau | G06K 9/6249 |
| | | | 706/52 |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0143911 A1* | 6/2012 | Liebald | G06F 17/30702 |
| | | | 707/771 |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0036076 A1* | 2/2013 | Yang | G06N 5/04 |
| | | | 707/755 |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2013/0325660 A1 | 12/2013 | Callaway | |
| 2013/0326325 A1 | 12/2013 | De et al. | |
| 2014/0013233 A1 | 1/2014 | Ahlberg et al. | |
| 2014/0022100 A1 | 1/2014 | Fallon et al. | |
| 2014/0046921 A1 | 2/2014 | Bau | |
| 2014/0089237 A1 | 3/2014 | Adibi | |
| 2014/0156634 A1 | 6/2014 | Buchmann et al. | |
| 2014/0229476 A1* | 8/2014 | Fouad et al. | 707/729 |
| 2014/0244550 A1 | 8/2014 | Jin et al. | |
| 2014/0255003 A1 | 9/2014 | Abramson et al. | |
| 2014/0280183 A1 | 9/2014 | Brown et al. | |
| 2014/0344288 A1* | 11/2014 | Evans | G06F 17/30867 |
| | | | 707/749 |
| 2014/0351233 A1 | 11/2014 | Crupi et al. | |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

Shui Lung Chuang and Lee-Feng Chien, "A Practical Web-based Approach to Generating Topic Hierarchy for Text Segments", 2004.*

David M. Blei et al, "Latent Dirichlet Allocation", 2003.*

(56) References Cited

OTHER PUBLICATIONS

International Search Report and Written Opinion dated Mar. 3, 2015, corresponding to International Patent Application No. PCT/US2014/067921, 10 pages.
International Search Report and Written Opinion dated Mar. 6, 2015 corresponding to International Patent Application No. PCT/US2014/067993, 9 pages.
International Search Report and Written Opinion dated Mar. 10, 2015 corresponding to International Patent Application No. PCT/US2014/067999, 10 pages.
International Search Report and Written Opinion of the International Searching Authority dated Apr. 15, 2015 corresponding to International Patent Application No. PCT/US2014/068002, 10 pages.
International Search Report and Written Opinion dated Feb. 24, 2015 corresponding to International Patent Application No. PCT/US2014/0067918, 10 pages.
Tunkelang, D. "Faceted Search," Morgan & Claypool Publ., 2009, pp. i-79.
Schuth, A., et al., "University of Amsterdam Data Centric Ad Hoc Faceted Search Runs," ISLA, 2012, pp. 155-160.
Tools, Search Query Suggestions using ElasticSearch via Shingle Filter and Facets, Nov. 2012, pp. 1-12.
International Search Report and Written Opinion of the International Searching Authority dated Apr. 15, 2015, corresponding to International Patent Application No. PCT/2014/067994, 9 pages.
Vizard, The Rise of In-Memory Databases, Jul. 13, 2012.
Jorg Becker, Dominik Kuropka, Witlod Ambramowicz, Gary Klein (eds), "Topic-based Vector Space Model," Business Information Systems, Proceedings of BIS 2003, Colorado Springs, USA.

\* cited by examiner

METHOD OF AUTOMATED DISCOVERY OF TOPICS RELATEDNESS

CROSS-REFERENCE TO RELATED APPLICATIONS

This application claims the benefit of U.S. Provisional Application No. 61/910,754, entitled "Method For Automated Discovery Of Topic Relatedness," filed Dec. 2, 2013, which is hereby incorporated by reference in its entirety.

This application is related to U.S. application Ser. No. 14/557,794, entitled "METHOD FOR DISAMBIGUATING FEATURES IN UNSTRUCTURED TEXTS," filed Dec. 2, 2014, now U.S. Pat. No. 9,239,875 issued Jan. 19, 2016, U.S. application Ser. No. 14/558,300, entitled "EVENT DETECTION THROUGH TEXT ANALYSIS USING TRAINED EVENT TEMPLATE MODELS," filed Dec. 2, 2014, now U.S. Pat. No. 9,177,254 issued Nov. 3, 2015, and U.S. application Ser. No. 14/558,076, entitled "METHOD FOR AUTOMATED DISCOVERY OF NEW TOPICS," filed Dec. 2, 2014, now U.S. Pat. No. 9,177,262 issued Nov. 3, 2015; each of which are hereby incorporated by reference in their entirety.

TECHNICAL FIELD

The present disclosure relates, in general, to data management; and, more specifically, to text analytics.

BACKGROUND

Using multiple topic models without determining their relatedness offers limited value. It becomes more difficult to find and discover a feature of interest as the collective knowledge continues to be digitized and stored in the form of news, blogs, Web pages, scientific articles, books, images, sound, video, and social networks. New computational tools to help organize, search, and understand these vast amounts of information are needed. Current tools to work with online information include search and links, automated and human generated topics.

One of the limitations of automatically generating topics is that models may be too broad or too specific, decreasing analytics accuracy that may be achieved as a result. In addition, automatically generated topics do not strongly define any taxonomy, ontology or other semantic meaning One of the limitations of human generated topics is they have human-bias, thus, topics and taxonomies represent a specific viewpoint. Human generated topics and topic taxonomies may be expensive and time consuming to create and maintain. In addition to being difficult and expensive to create and maintain, human generated topics may not meet the needs of various users.

Therefore, there is still a need for automatically discovering related topics from a corpus ranging from broad topics to more specific topics based on the content of a large corpus. Automatically discovered topic relationships can improve search results, content navigation and provide increased precision for text analytics tasks including entity disambiguation and document linking using the discovered topic relationships.

SUMMARY

An aspect of the present disclosure is a system and method for automated discovery of topic relatedness, using probabilistic modeling, such as a multi-component extension of latent Dirichlet allocation (MC-LDA) or similar methods, to discover topics in a corpus, employing multiple topic identification (ID) models, with differing numbers of topics, tagging topics in all docs, and analyzing co-occurring topic IDs from the different models to discover relatedness by assigning topic relatedness scores, where related topics may be employed for matching/linking topics with documents.

Benefits of the disclosed system and method may be an increased disambiguation precision, allowing matching and linking of documents using the discovered relationships.

One aspect of the present disclosure may be the development of multiple topic models (e.g., based on latent Dirichlet allocation (LDA) or a similar method) against a large corpus of documents, in order to automatically generate topics at different levels of granularity or other model differences and build a hierarchy of related topics dynamically from the corpus.

Topic models may differ in terms of the topics they identify and other parameters. One model may have broad base topics; other models may have greater level of granularity.

Another aspect of the present disclosure may be to classify a large corpus of documents using all the topic models, in order to determine topic relatedness among all the topics using the topic co-occurrence within the corpus.

The disclosed method for automated discovery of topic relatedness may be employed to perform entity disambiguation, as a tool for search navigation, to find related articles, and to discover information from an unknown corpus.

In one embodiment, a method comprises generating, via a first topic model computer, a first term vector identifying a first topic in a plurality of documents in a document corpus; generating, via a second topic model computer, a second term vector identifying a second topic in the plurality of documents in the document corpus; linking, via a topic detection computer, each of the first and second topics across the plurality of documents in the document corpus; assigning, via the topic detection computer, a relatedness score to each of the linked first and second topics based on co-occurrence of each of the linked first and second topics across the plurality of documents in the document corpus; and determining, via the topic detection computer, whether the first and second linked topics are related across the plurality of documents in the document corpus based at least in part on the relatedness score.

In another embodiment, a system comprises a first topic model computer comprising a processor configured to generate a first term vector identifying a first topic in a plurality of documents in a document corpus; a second topic model computer comprising a processor configured to generate a second term vector identifying a second topic in the plurality of documents in the document corpus; and a topic detection computer comprising a processor configured to: (a) link each of the first and second topics across the plurality of documents in the document corpus, (b) assign a relatedness score to each of the linked first and second topics based on co-occurrence of each of the linked first and second topics across the plurality of documents in the document corpus, and (c) determine whether the first and second linked topics are related across the plurality of documents in the document corpus based at least in part on the relatedness score.

In yet another embodiment, a non-transitory computer readable medium is provided having stored thereon computer executable instructions. The instructions comprise generating, via a first topic model computer module of a computer, a first term vector identifying a first topic in a plurality of documents in a document corpus, generating, via a second topic model computer module of the computer, a second term vector identifying a second topic in the plurality of documents in the document corpus, and linking, via a topic detection computer module of the computer, each of the first and second topics across the plurality of documents in the document corpus. The instructions further include assigning, via the topic detection computer module of the computer, a relatedness score to each of the linked first and second topics based on co-occurrence of each of the linked first and second topics across the plurality of documents in the document corpus, and determining, via the topic detection computer module of the computer, whether the first and second linked topics are related across the plurality of documents in the document corpus based at least in part on the relatedness score.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
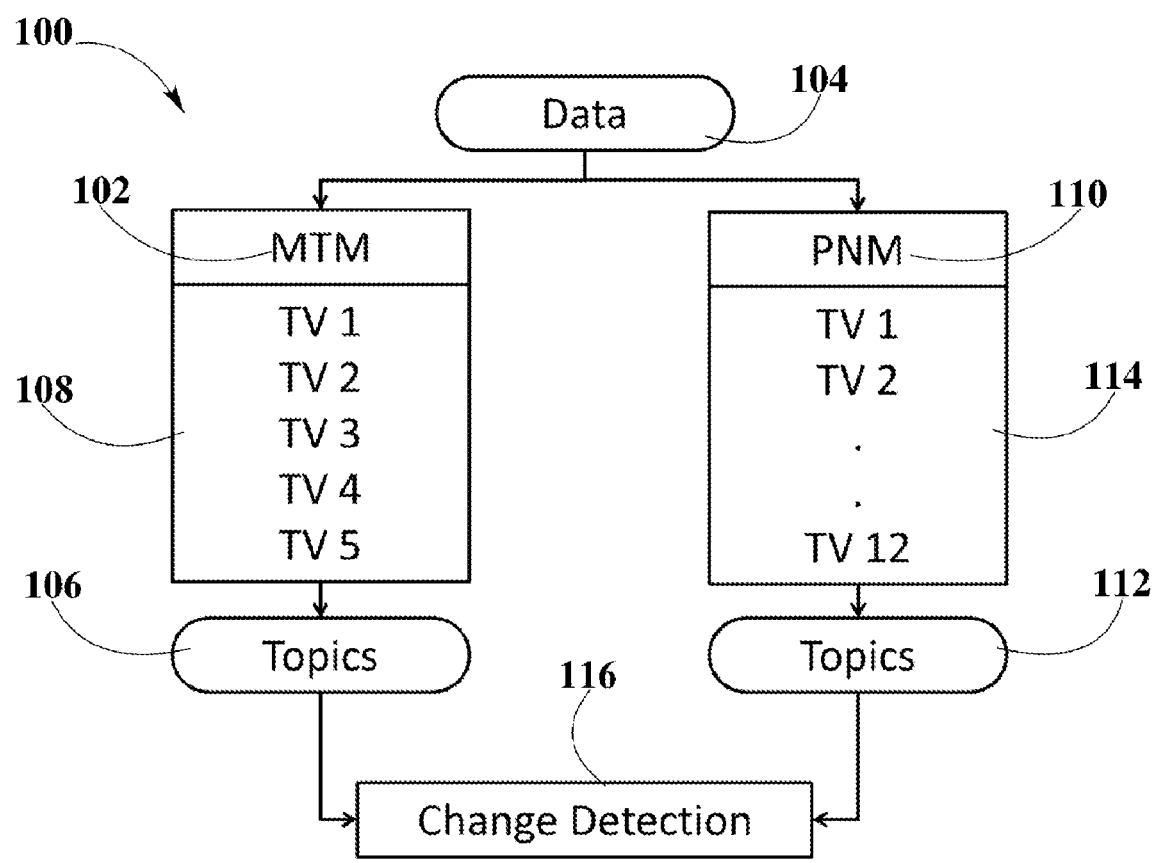
FIG. 1 is a block diagram of a computer system for discovering topics, according to an exemplary embodiment.

As used herein, the following terms have the following definitions:

"Document" refers to a discrete electronic representation of information having a start and end.

"Corpus" refers to a collection, including a computer database, of one or more documents.

"Feature" refers to any information which is at least partially derived from a document.

"Feature attribute" refers to metadata associated with a feature; for example, location of a feature in a document, among others.

"Memory" refers to any hardware component suitable for storing information and retrieving said information at a sufficiently high speed.

"Topic" refers to a set of thematic information which is at least partially derived from a corpus.

"Topic Model" refers to a computer based hypothetical description of a complex entity or process.

"Term Vector" refers to a computer based algebraic model for representing text documents (and any objects, in general) as vectors of identifiers, e.g., index terms.

DETAILED DESCRIPTION

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

The present disclosure describes a system and method for automated discovery of topic relatedness.

Some embodiments may develop multiple computer executed topic models against a large corpus of documents, including various types of knowledge bases from sources such as the internet and internal networks, among others.

The embodiments herein recite a notion of "topic" relatedness and methods for the automatic discovery of topic relatedness in a large document corpus. In exemplary method, the topic relatedness among the documents can be computed based on pre-built topic models. This "topic" relatedness can be used as a supplementary feature to enhance various existing applications related to data analytics in general and text analytics. Additionally, these different pre-built topic models (employed for computing topic relatedness) are built with different levels of granularity of topics, vocabulary, and converging parameters, thereby providing a vertical hierarchy/scalability over a specific domain of interest. LDA topic modeling can be extended to support multi-component LDA, where each component is treated as conditionally-independent, given document topic proportions. This components can include features, such as terms, key phrases, entities, facts, etc. This approach can provide a concept of horizontal scalability of the topic models over a specific domain. Further, analytics application can benefit from the described notion of topic relatedness.

FIG. 1 is a block diagram of a computer system 100 for automated discovery of new topics, according to an embodiment. Computer system 100 comprises at least one processor configured to execute at least one module. In this exemplary embodiment, the system 100 for automated discovery of new topics may include a master topic model (MTM) computer module 102 that executes computer readable instructions for building a master topic computer model based on data 104 extracted from a large corpus of documents. MTM module 102 may produce a set of topics 106 defined by a set 108 of term vectors. As newer data 104 is uploaded to the corpus, a periodic new model (PNM) computer module 110 executes computer readable instructions for creating a periodic new computer model to periodically analyze newer data 104. PNM computer module 110 produces another set of topics 112 defined by a new set 114 of term vectors. Change detection computer module 116 executes computer readable instructions for measuring differences between topics 106 and topics 112 to identify new topics that are not represented. Change detection computer module 116 may also use term vector differences to compare and measure the significance of topics based on established thresholds. Change detection computer module 116 may produce zero or more topics that are not represented in the old model. In this way, the system may periodically add the new topics to the MTM module 102.

According to one embodiment, the respective computer topic models executed by the MTM module 102 and PNM module 110 may be developed using a multi-component extension of latent Dirichlet allocation (MC-LDA) or similar methods.

The models may differ in terms of the topics identified and other parameters, such as the multi-document components used, the vocabulary size for each component, and hyperparameter settings for the prior Dirichlet distributions on topic-term and document-topic proportions, among other parameters. In an embodiment, one model may have broad based topics, while the other model may have a greater level of topic granularity.

According to various embodiments, a large corpus of documents may be classified employing all the models generated in the system 100 for automated discovery of topics.

According to various embodiments, the topics may be automatically generated at different levels of granularity or by other model differences, such as the multi-document components used, the vocabulary size for each component, and hyperparameter settings for the prior Dirichlet distributions on topic-term and document-topic proportions, among others. The generated topics may be used to build a hierarchy of related topics dynamically from a corpus.

Subsequently, topic relatedness may be determined among all the topic co-occurrence within the corpus.

Figure 2:
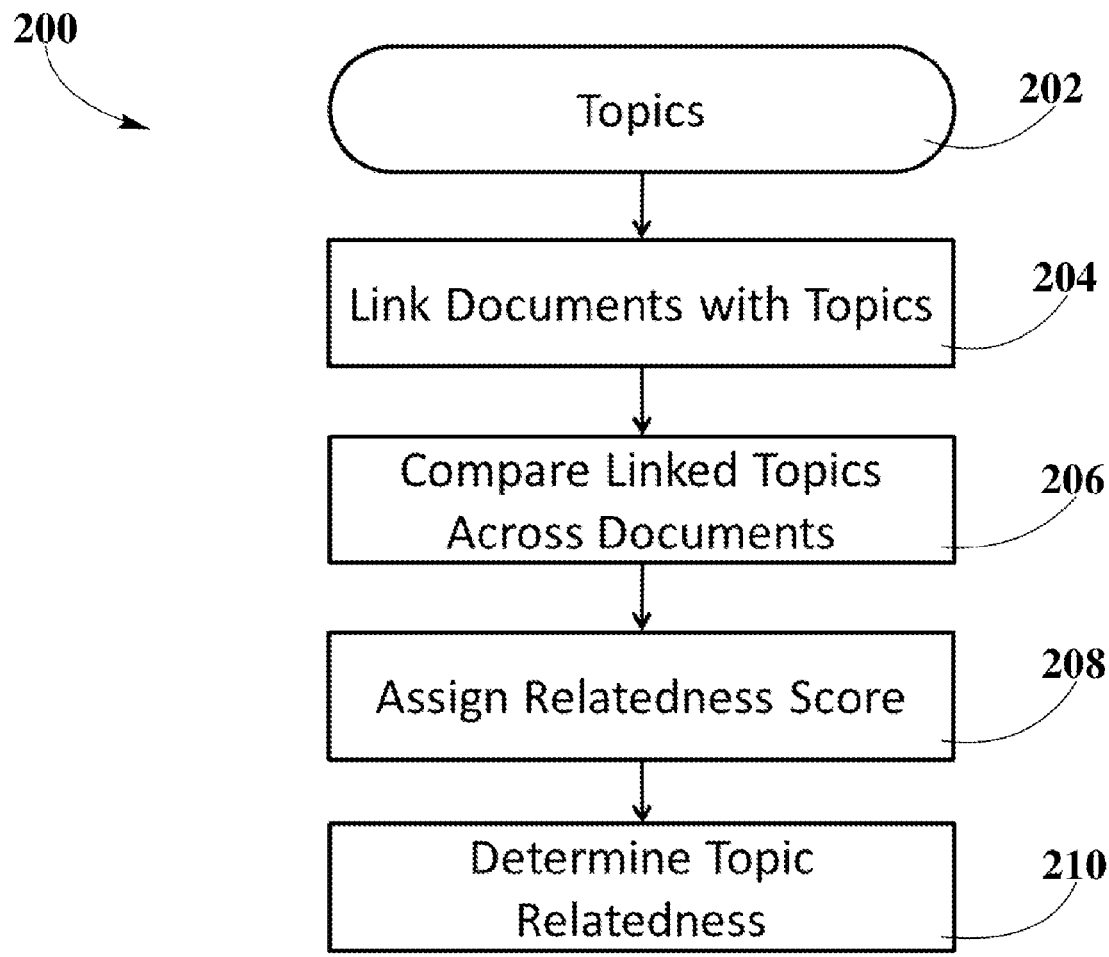
FIG. 2 is a flowchart of a method for discovering topic relatedness, according to an exemplary embodiment.

FIG. 2 is a flowchart of a method 200 for automated discovery of topic relatedness, according to an embodiment.

In step 202, topics in a document corpus are identified, via the computer system 100, for automated discovery of new topics. In step 204, the identified topics may be linked with documents within a corpus under analysis (e.g., via the change detection computer module 116). The linked topics may be compared, in step 206, across all documents, in order to assign relatedness scores in step 208.

According to one embodiment, the change detection computer module 116 creates a graph of co-occurring topics as topics are linked with documents in the document corpus.

In step 210, depending on the relatedness score assigned to each topic in step 208, the change detection computer module 116 determines topic relatedness employing weighting algorithms. According to various embodiments, the weighting algorithms may use the topic co-occurrence within a document and across documents of the corpus. The higher the weight assigned to a topic, the higher the relatedness score may be assigned between topics.

Figure 3:
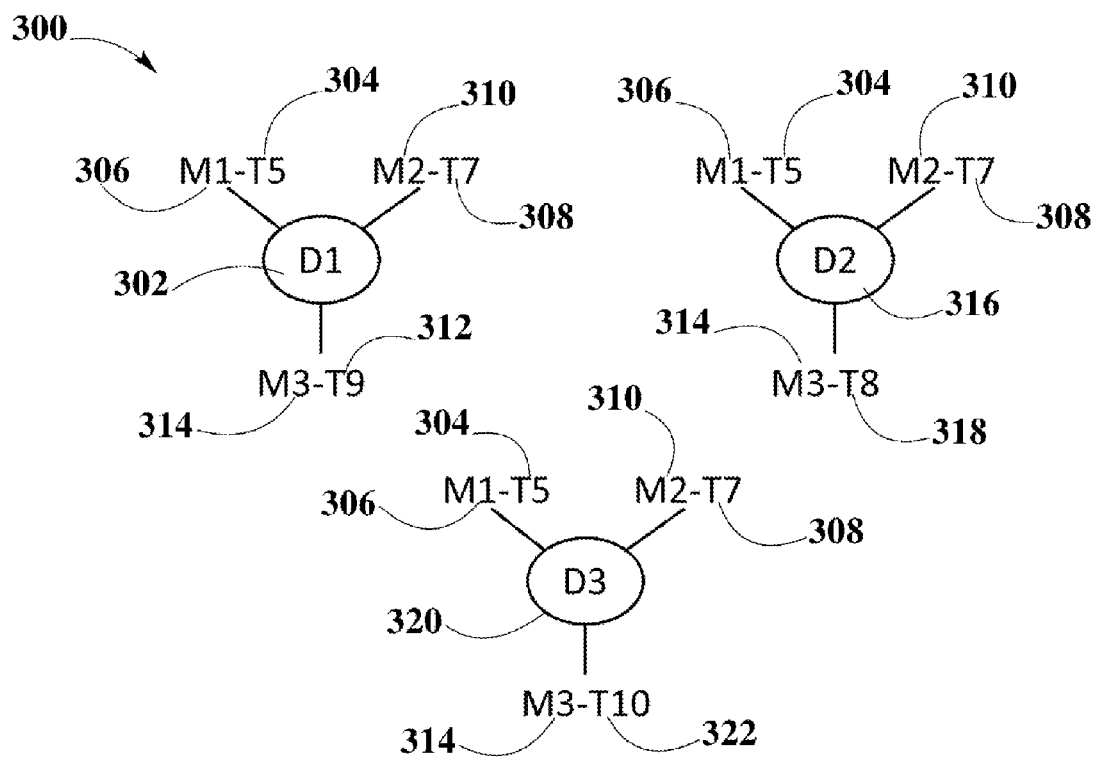
FIG. 3 is diagram of a graphical representation of topic relatedness among documents, according to an exemplary embodiment.

FIG. 3 is a diagram of a graphical representation of records in a database 300, showing co-occurring topics between documents, which may be employed to determine topic relatedness, according to an embodiment. The database may comprise a plurality of records, each record storing information pulled from a machine readable computer file (e.g., a document). The information may include a topic. The graphical representation shows relationships between these records.

The graph of co-occurring topics may include the representation of each document analyzed within a corpus, as well as the models and topics associated to the document.

After generating topic models by computer system 100, a number of topics may be identified within the corpus data 104. The generated topics may be linked with related documents. Each topic model may include different parameters and, thus, different number of topics. In an embodiment, one model may have 64 topics, another model may have 1024 topics, and other models may have 16,000 topics.

For example, for a corpus of documents, computer system 100 can build three computer-generated topic models. Document one 302 may include topic five 304 from model one 306, topic seven 308 from model two 310, and topic nine 312 from model three 314. Document two 316 may include topic five 304 from model one 306, topic seven 308 from model two 310, and topic eight 318 from model three 314. Document three 320 may include topic five 304 from model one 306, topic seven 308 from model two 310, and topic ten 322 from model three 314.

Because document one 302, document two 316, and document three 320 include topic five 304 from model one 306 and topic seven 308 from model two 310, it implies that a relatedness may occur between topic five 304 and topic seven 308. In this example, there may be some relatedness between topic nine 312 (from model three 314) and topic seven 308, or topic eight 318 and topic seven 308, but it may be a weaker relatedness than the relatedness between topic five 304 and topic seven 308.

The resulting web may be represented by methods known for those skilled in the art, such as bipartite graphs, weighted graphs, and probabilistic graphs, among others. The representation may be employed to identify topic co-occurrences among the documents within the corpus.

Therefore, an entire document corpus may be analyzed to find the strongest relatedness between the discovered topics 202, which may be represented by mechanisms known for those skilled in the art such as community detection in networks, Markov clustering in graphs, and spectral clustering in graphs, among others.

Applying topic relatedness within documents of a corpus, topic relatedness may be determined by employing topic co-occurrence within a corpus.

Example #1 is an application of a method for automated discovery of topic relatedness, where the method of automated discovery may be employed to perform feature disambiguation within documents of a corpus.

Example #2 is an application of a method for automated discovery of topic relatedness, where the method of automated discovery may be employed as a tool for search navigation or browsing.

Example #3 is an application of a method for automated discovery of topic relatedness, where the method of automated discovery may be employed to find related articles.

Example #4 is an application of a method for automated discovery of topic relatedness, where the method of automated discovery may be employed to perform information discovery of related topics from an unknown corpus.

Example #5 is an application of a method for automated discovery of topic relatedness, where the method of automated discovery may be employed by varying the quantity of models and/or topics.

Example #6 is an application of a method for automated discovery of topic relatedness, where the method of automated discovery may use any domain of data.

Example #7 is an application of a method for automated discovery of topic relatedness, where the method of automated discovery may be employed to find related features or entities.

Example #8 is an application of a method for automated discovery of topic relatedness, where the method of automated discovery may be employed to discover a hierarchy of relations.

Example #9 is an application of a method for automated discovery of topic relatedness, where the method of automated discovery may be employed to determine the relatedness/mapping of independently defined hierarchies (i.e. medical coding, product codes, ISO/FIPS codes).

Example #10 is an application of a method for automated discovery of topic relatedness, where the method of automated discovery may be employed to map a human taxonomy to an automatically discovered topic hierarchy. This mapping can provide human friendly names to the topics.

Example #11 is an application of a method for automated discovery of topic relatedness, where the method of automated discovery may be employed to measure the relatedness of extracted features.

Example #12 is an application of a method for automated discovery of topic relatedness, where the method of automated discovery may employ textual data/video data/image data.

Example #13 is an application of a method for automated discovery of topic relatedness, where the method of automated discovery may be employed to perform signal analysis.

Example #14 is an application of a method for automated discovery of topic relatedness, where the method of automated discovery may be employed to relate multiple independent signatures.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   generating, via a first topic model computer, a first term vector identifying a first topic in a plurality of documents in a document corpus;
   generating, via a second topic model computer, a second term vector identifying a second topic in the plurality of documents in the document corpus;
   linking, via a topic detection computer, each of the first and second topics across the plurality of documents in the document corpus, wherein linking comprises matching of the each of the first and second topics across the plurality of documents in the document corpus and indicates a tag associated with metadata that the first and second topics are each identified in at least one document in the document corpus;
   assigning, via the topic detection computer, a relatedness score weight to each of the linked first and second topics based on co-occurrence of each of the linked first and second topics across the plurality of documents in the document corpus;
   determining, via the topic detection computer, whether the first and second linked topics are related across the plurality of documents in the document corpus based at least in part on the relatedness score weight;
   executing via the first topic model computer, a master topic computer model based on a multi-component extension of latent Dirichlet allocation having a first set of model parameters; and
   executing via the second topic model computer, a periodic new topic computer model based on the multi-component extension of latent Dirichlet allocation having a second set of model parameters different from the first set of model parameters.

2. The method of claim 1, wherein the topic detection computer determines one or more differences between the first and second topics to identify at least one new topic and adds the at least one new topic as a model parameter to the first topic model computer.

3. The method of claim 1, further comprising generating, via the change detection computer, a hierarchy of related topics in the document corpus.

4. The method of claim 1, wherein the first topic model computer and the second topic model computer execute respective first and second topic computer models having one or more parameters selected from the group consisting of a multi-document component, a vocabulary size, and a parameter setting for a prior Dirichlet distribution on a topic term.

5. The method of claim 1, wherein the linking step further comprising generating a graphical representation of co-occurring linked topics across the plurality of documents in the document corpus.

6. A system comprising:
a first computer comprising a processor executing a master topic model (MTM) computer module, the first computer configured to generate a first term vector identifying a first topic in a plurality of documents in a document corpus;
a second computer comprising a processor executing a periodic new model (PNM) computer module, the second computer configured to generate a second term vector identifying a second topic in the plurality of documents in the document corpus; and
a third computer comprising a processor executing a change detection computer module, the third computer configured to:
(a) link each of the first and second topics across the plurality of documents in the document corpus by matching the first and second topics across the plurality of documents in the document corpus, a link indicating a tag associated with metadata that the first and second topics are each identified in at least one document in the document corpus,
(b) assign a relatedness score weight to each of the linked first and second topics based on co-occurrence of each of the linked first and second topics across the plurality of documents in the document corpus,
(c) determine whether the first and second linked topics are related across the plurality of documents in the document corpus based at least in part on the relatedness score weight;
(d) execute a master topic computer model based on a multi-component extension of latent Dirichlet allocation having a first set of model parameters; and
the second computer's processor further executing a periodic new topic module to detect a new topic, the new topic module configuring the second computer to perform a new topic model based on the multi-component extension of latent Dirichlet allocation having a second set of model parameters different from the first set of model parameters.

7. The system of claim 6, wherein the third computer is further configured to determine one or more differences between the first and second topics to identify at least one new topic and add the at least one new topic as a model parameter to the first computer.

8. The system of claim 6, wherein the third computer is further configured to generate a hierarchy of related topics in the document corpus.

9. The system of claim 6, wherein the first computer and the second computer are further configured to execute respective first and second topic computer models having one or more parameters selected from the group consisting of a multi-document component, a vocabulary size, and a parameter setting for a prior Dirichlet distribution on a topic term.

10. The system of claim 6, wherein the change detection computer module is further configured to generate a graphical representation of co-occurring linked topics across the plurality of documents in the document corpus.

11. A non-transitory computer readable medium having stored thereon computer executable instructions comprising:
generating, via a first topic model computer module of a computer, a first term vector identifying a first topic in a plurality of documents in a document corpus;
generating, via a second topic model computer module of the computer, a second term vector identifying a second topic in the plurality of documents in the document corpus;
linking, via a topic detection computer module of the computer, each of the first and second topics across the plurality of documents in the document corpus, wherein linking comprises matching of the each of the first and second topics across the plurality of documents in the document corpus, and indicates a tag associated with metadata that the first and second topics are each identified in at least one document in the document corpus;
assigning, via the topic detection computer module of the computer, a relatedness score weight to each of the linked first and second topics based on co-occurrence of each of the linked first and second topics across the plurality of documents in the document corpus;
determining, via the topic detection computer module of the computer, whether the first and second linked topics are related across the plurality of documents in the document corpus based at least in part on the relatedness score weight
executing, via the first topic model computer module, a master topic computer model based on a multi-component extension of latent Dirichlet allocation having a first set of model parameters; and
executing, via the second topic model computer module, a periodic new topic computer model based on the multi-component extension of latent Dirichlet allocation having a second set of model parameters different from the first set of model parameters.

12. The computer readable medium of claim 11 wherein the instructions further comprise determining, via the topic detection computer module of the computer, one or more differences between the first and second topics to identify at least one new topic and adds the at least one new topic as a model parameter to the first topic model computer module.

13. The computer readable medium of claim 11 wherein the instructions further comprise generating, via the topic detection computer module of the computer, a hierarchy of related topics in the document corpus.

14. The computer readable medium of claim 11 wherein the instructions further comprise executing, via the first and second topic model computer modules, respective first and second topic computer models having one or more parameters selected from the group consisting of a multi-document component, a vocabulary size, and a parameter setting for a prior Dirichlet distribution on a topic term.

\* \* \* \* \*